(12) United States Patent
Chang

(10) Patent No.: US 6,956,550 B2
(45) Date of Patent: Oct. 18, 2005

(54) DRIVE MODULE OF LIQUID CRYSTAL PANEL

(75) Inventor: Pin Chang, Hsinchu (TW)

(73) Assignee: Giantplus Technology Co., Ltd., Miaoli Hsien (TW)

( * ) Notice: Subject to any disclaimer, the term of this patent is extended or adjusted under 35 U.S.C. 154(b) by 265 days.

(21) Appl. No.: 10/358,243

(22) Filed: Feb. 5, 2003

(65) Prior Publication Data

US 2004/0150597 A1    Aug. 5, 2004

(51) Int. Cl.⁷ .................. G09G 3/36; G02F 1/1343; G02F 1/1345
(52) U.S. Cl. .................. 345/87; 345/204; 349/139; 349/149
(58) Field of Search .................. 345/87, 103, 88, 345/204; 349/139, 149–152

(56) References Cited

U.S. PATENT DOCUMENTS 5,642,127 A  *  6/1997  Tamai .................. 345/95
6,747,724 B2 *  6/2004  Onaka et al. ............ 349/149

* cited by examiner

*Primary Examiner*—Patrick N. Edouard
*Assistant Examiner*—Robin Mak
(74) *Attorney, Agent, or Firm*—Rosenberg, Klein & Lee

(57) ABSTRACT

A drive module of liquid crystal panel is formed by arranging a plurality of transversal signal scan lines and a plurality of longitudinal data transmission lines on a liquid crystal panel. A signal scan control IC and a data transmission control IC having a memory component and a panel controller built therein are disposed at the upper and lower sides of the liquid crystal panel, respectively. Each of the data transmission lines is connected to the data transmission control IC with the shortest distance. The signal scan lines are connected to contacts at two sides of the signal scan control IC from two sides of the liquid crystal panel. The earlier a signal scan line is for scan, the closer to the inner side it is connected to a contact on the signal scan control IC.

3 Claims, 6 Drawing Sheets

DRIVE MODULE OF LIQUID CRYSTAL PANEL

FIELD OF THE INVENTION

The present invention relates to a liquid crystal display and, more particularly, to a drive module of liquid crystal panel.

BACKGROUND OF THE INVENTION

Displays play the roles as output devices for showing pictures and texts in the present information society. Along with the development of information products toward compactness, liquid crystal panels have become inevitable equipments in some small portable displays like personal digital assistant (PDA), mobile phones, digital cameras, video games and digital watches.

In a liquid crystal display, an image output is composed of many pixels arranged in array on a liquid crystal panel. Driving of pixels is controlled by a drive module composed of a plurality of transversal signal scan lines (Common) and a plurality of longitudinal data transmission lines (Segment). As shown in FIG. 1, in the prior art, a plurality of signal scan lines 12 and a plurality of data transmission lines 14 are connected to a signal scan drive IC 16 and a data transmission drive IC 18 disposed at two adjacent sides of a panel 10, respectively. The brightness of pixels 11 is controlled by the two drive ICs 16 and 18. In fabrication, a high pressure process and a low pressure process are adopted for the signal scan drive IC 16 and the data transmission drive IC 18, respectively. However, in addition to occupying a larger circuit layout space, this kind of design of arranging the two drive ICs 16 and 18 at two adjacent sides of the panel 10 also reduces space of the panel for image display. Moreover, because all adjacent signal scan lines 12 and all adjacent data transmission lines 14 are densely arranged, a high voltage difference between contacts of two adjacent signal scan lines on the drive ICs 16 and 18 will arise, hence easily having the drawback of signal interference. Besides, when this kind of drive module is used, an external memory (RAM) (not shown) is required for full operation, hence resulting in much inconvenience.

FIG. 2 shows the structure of another drive module in the prior art. A single chip IC 20 is disposed at the lower edge of a panel 10. In addition to connecting a plurality of data transmission lines 14, the single chip IC 20 also connects a plurality of signal scan lines 12. In order to let the layout of the signal scan lines 12 connected to the single chip IC 12 be not too dense to cause difficulty in fabrication, the signal scan lines 12 are divided into a front and a rear section. The signal scan lines 12 of these two sections are connected to contacts at two sides of the single chip IC 20, respectively. In addition to having the inbuilt drive function of the data transmission lines 14 and the signal scan lines 12, the single chip IC 20 also integrates the functions of a memory and a controller. Therefore, the fabrication process of this single chip IC 20 is very complicated. Moreover, in order to match the high pressure process of the signal scan lines 12, the whole single chip IC 20 needs to be processed at a high pressure, hence having a very high cost and thus greatly increasing the fabrication cost of this drive module.

Accordingly, the present invention aims to propose a low-cost drive module of liquid crystal panel to resolve the problems in the prior art.

SUMMARY OF THE INVENTION

The primary object of the present invention is to propose a drive module of liquid crystal panel, which utilizes a signal scan drive IC and a data transmission drive IC integrating the functions of a memory and a controller to control the operation of a liquid crystal panel. The drive module of the present invention can lower the cost to apply to portable products.

Another object of the present invention is to propose a drive module of liquid crystal panel, which lets adjacent signal scan lines be connected to the signal scan drive IC from different ends thereof to lower the density of layout of the signal scan lines, thereby avoiding signal distortion due to mutual interference of signals.

Yet another object of the present invention is to propose a drive module of liquid crystal panel, whose circuit layout will let the space usage of a liquid crystal panel be more efficient to effectively increase the image display area of the liquid crystal panel.

According to the present invention, a drive module of liquid crystal panel is formed by arranging a plurality of transversal signal scan lines and a plurality of longitudinal data transmission lines on a liquid crystal panel composed of a plurality of pixels. A signal scan control IC and a data transmission control IC are disposed at the upper and lower sides of the liquid crystal panel, respectively. A memory component and a panel controller are built in the data transmission control IC. One end of each of the data transmission lines is connected to the data transmission control IC. The transversal signal scan lines are led out from two sides of the liquid crystal panel and are connected to contacts at two sides of the signal scan control IC, respectively. The earlier a signal scan line is for scan, the closer to the inner side it is connected to a contact on the signal scan control IC.

The various objects and advantages of the present invention will be more readily understood from the following detailed description when read in conjunction with the appended drawings, in which:

DETAILED DESCRIPTION OF THE PREFERRED EMBODIMENTS

Figure 1:
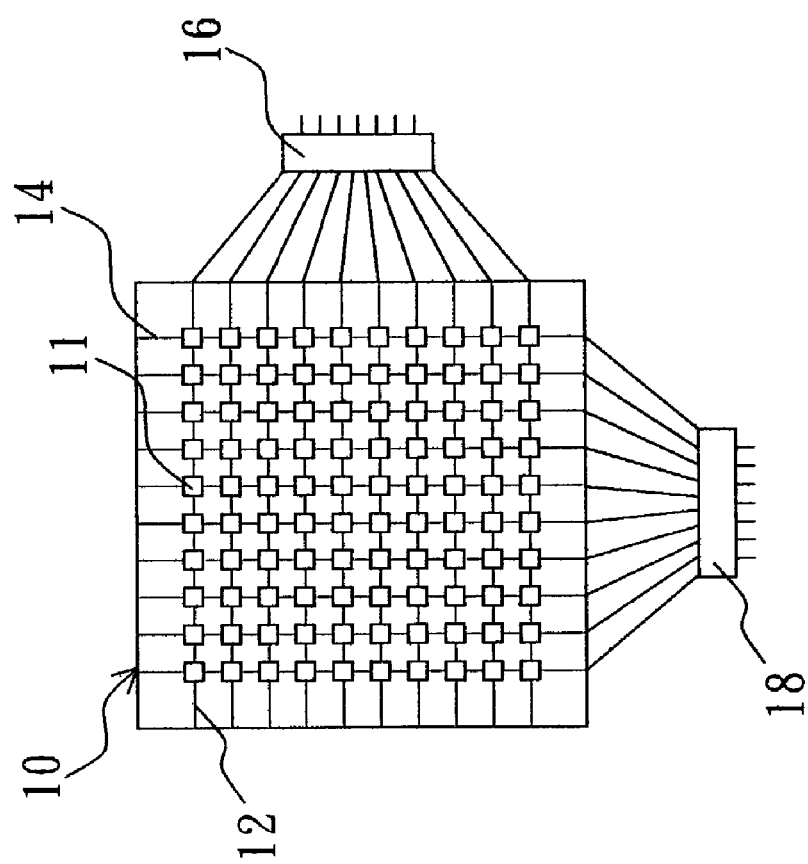
FIG. 1 is a diagram of a conventional drive module of liquid crystal panel.
Figure 2:
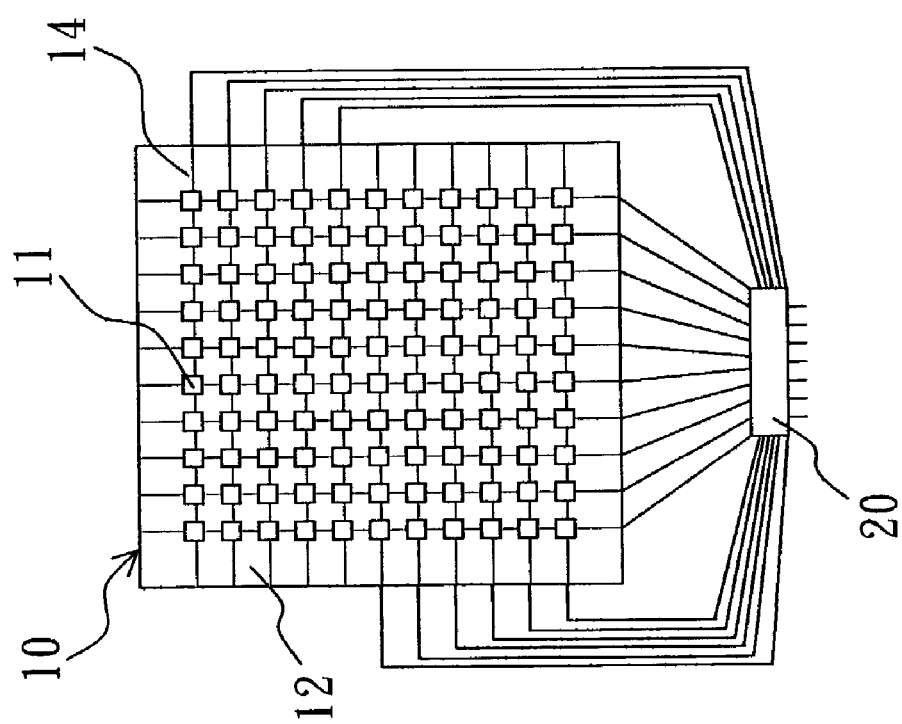
FIG. 2 is a diagram of another conventional drive module of liquid crystal panel.
Figure 3:
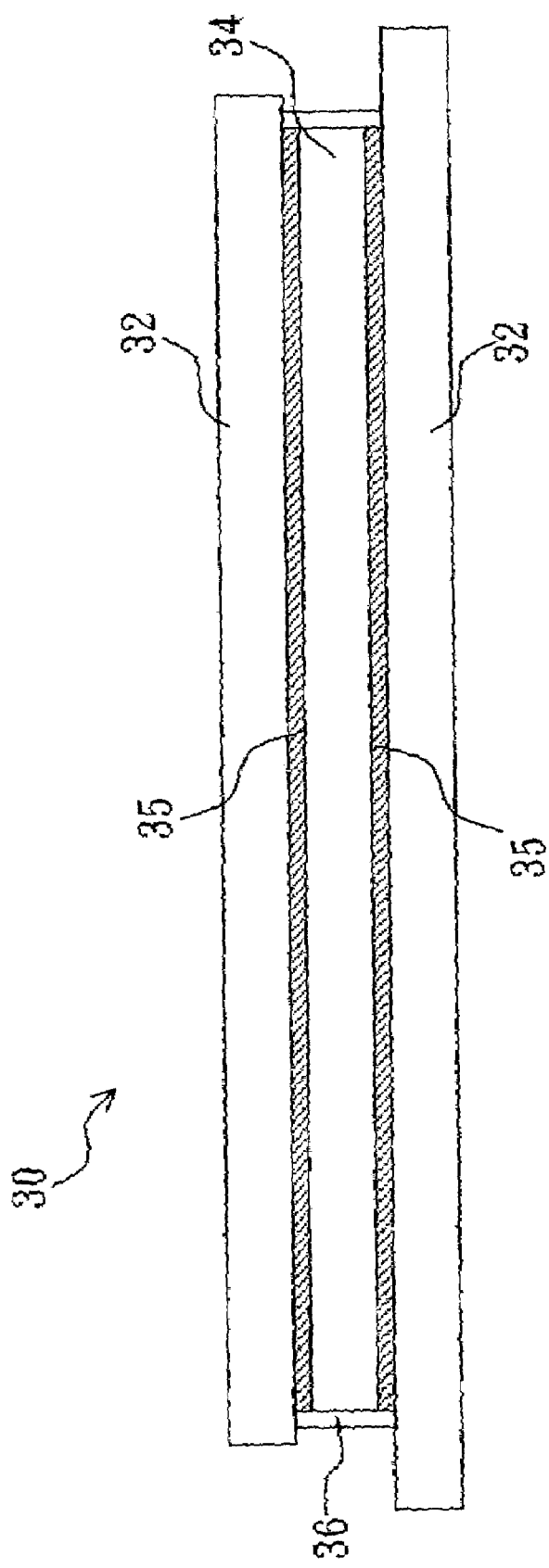
FIG. 3 is a structure diagram of a liquid crystal panel.
Figure 4:
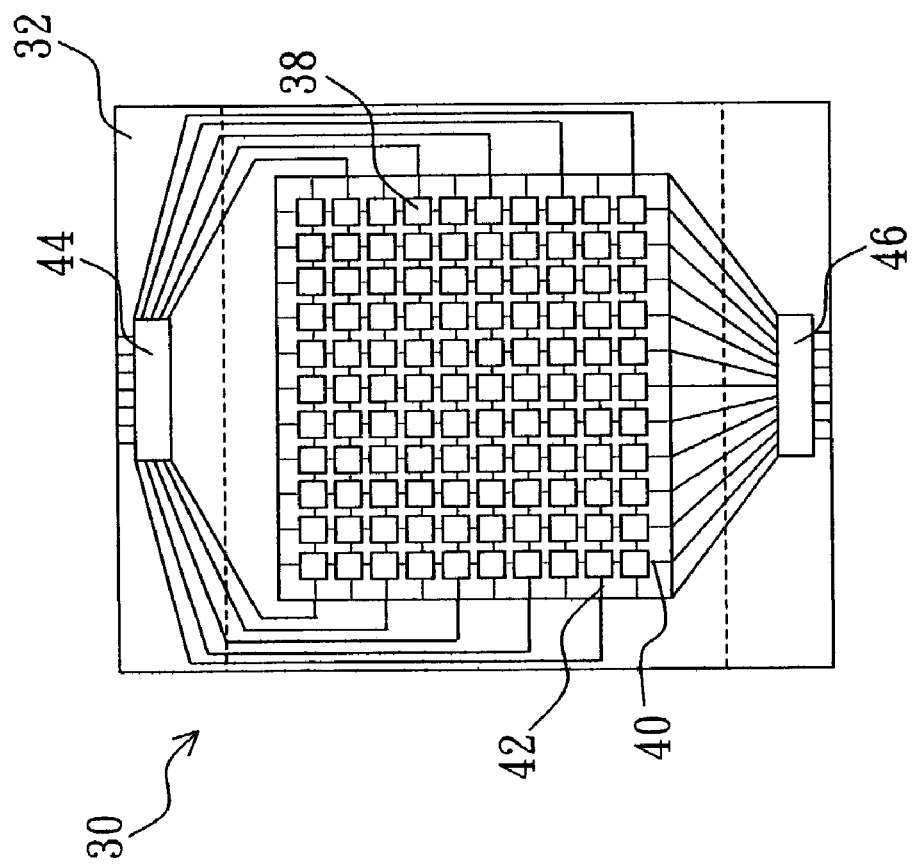
FIG. 4 is a structure diagram of a drive module of the present invention.

As shown in FIG. 3, a liquid crystal panel 30 is formed by clamping a liquid crystal layer 34 between a pair of opposed glass substrates 32 and 32'. A frame seal is annularly disposed between the two glass substrates 32 and 32' to seal the liquid crystal layer 34. Two transparent electrodes 35 and 35' are disposed on opposed inner surfaces of the two glass substrates 32 ad 32', respectively. The brightness of each pixel 38 on the liquid crystal panel 30 is controlled by a data transmission line 40 and a signal scan line 42. Please also refer to FIG. 4. a plurality of longitudinal data transmission lines 40 and a plurality of transversal signal scan lines 42 are disposed on the liquid crystal panel 30 having a plurality of pixels 38 arranged in array thereon. Each of the data transmission lines 40 corresponds to a longitudinal row of pixels 38, while each of the signal scan lines 42 corresponds to a transversal row of pixels 38. A signal scan control IC 44 and a data transmission control IC 46 are symmetrically disposed at the upper and lower sides of the glass substrate 32, respectively. The bottom end of each of the longitudinal data transmission lines 40 is connected to the data transmission control IC 46. Adjacent signal scan lines 42 are alternately connected to the signal scan control IC 44 located above from different ends thereof one by one.

The data transmission lines 40 and the signal scan lines 42 are modules composed of an upper layer and a lower layer of indio tin oxide (ITO), respectively. They are uniformly disposed on the transparent electrode plates 35 and 35' in the liquid crystal panel 30. In addition to having the function of driving the data transmission lines 40, the data transmission control IC 46 also has a memory component (not shown) and a panel controller (not shown) built therein. On the other hand, the data transmission control IC 46 and the signal scan control IC 44 are disposed on the liquid crystal panel 30 by means of chip on glass (COG). Tiny semispherical contacts 48 designed on the bare ICs and contacts of the liquid crystal panel 30 are welded together.

Figure 5:
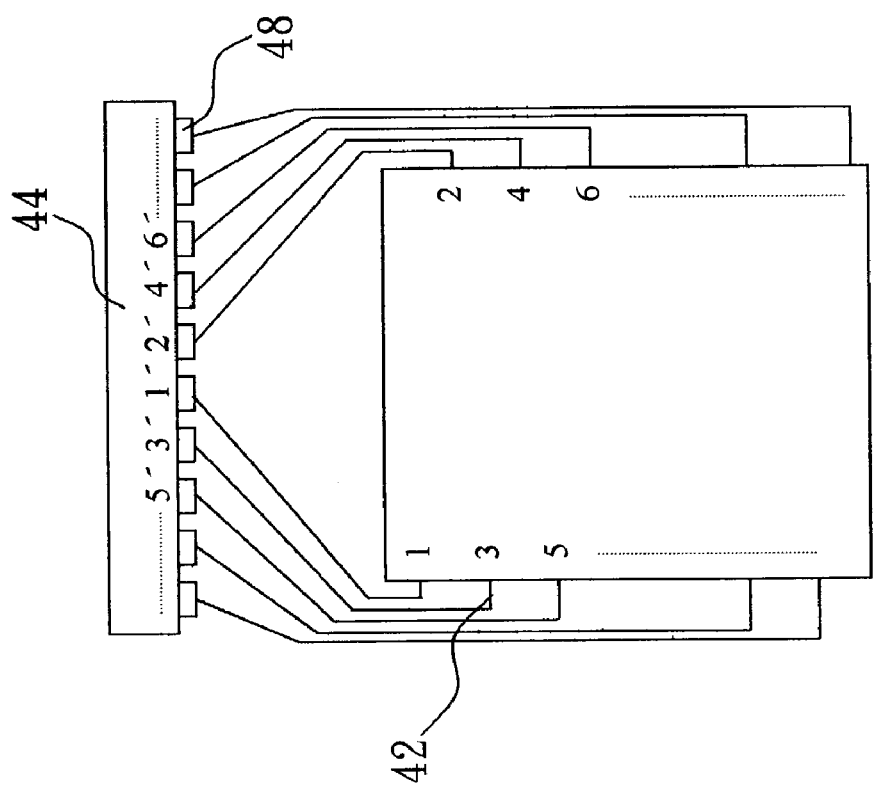
FIG. 5 is a diagram showing the connection of signal scan lines and a signal scan control IC according to an embodiment of the present invention.

When the signal scan lines 42 are connected to the signal scan control IC 44 from two sides of the liquid crystal panel 30, the way of layout is shown in FIG. 5. For convenience of illustration, the scan orders of the signal scan lines 42 on the liquid crystal panel 30 are labeled by 1, 2, 3, 4, 5, 6 . . . from top to bottom in order. The smaller the labeled number, the earlier the signal scan line 42 for scan. Moreover, the signal scan lines 42 with odd labeled numbers (1, 3, 5 . . . ) are connected to the signal scan control IC 44 from the left side of the liquid crystal panel 30, while the signal scan lines 42 with even labeled numbers (2, 4, 6 . . . ) are connected to the signal scan control IC 44 from the right side of the liquid crystal panel 30. The contacts 48 of the signal scan control IC 44 are divided into a left and a right section. In each section, the contacts 48 at the more inner side of the signal scan control IC 44 are connected to the more upper (i.e., earlier for scan) signal scan lines 42. That is, the contacts 48 from inside to outside are connected to the signal scan lines 42 from top to down. In the figure, the contacts 48 of the signal can control IC 44 corresponding to the signal scan lines 42 labeled by 1, 2, 3, 4, 5, 6 . . . are labeled by 1', 2', 3', 4', 5', 6' . . . , respectively. This kind of design of adjusting the arrangement order of the contacts 48 on the signal scan control IC 44 will not cause difficult fabrication and signal distortion due to alternation of circuit when connecting the signal scan lines 42 to the signal scan control IC 44 above the liquid crystal panel 30.

Figure 6:
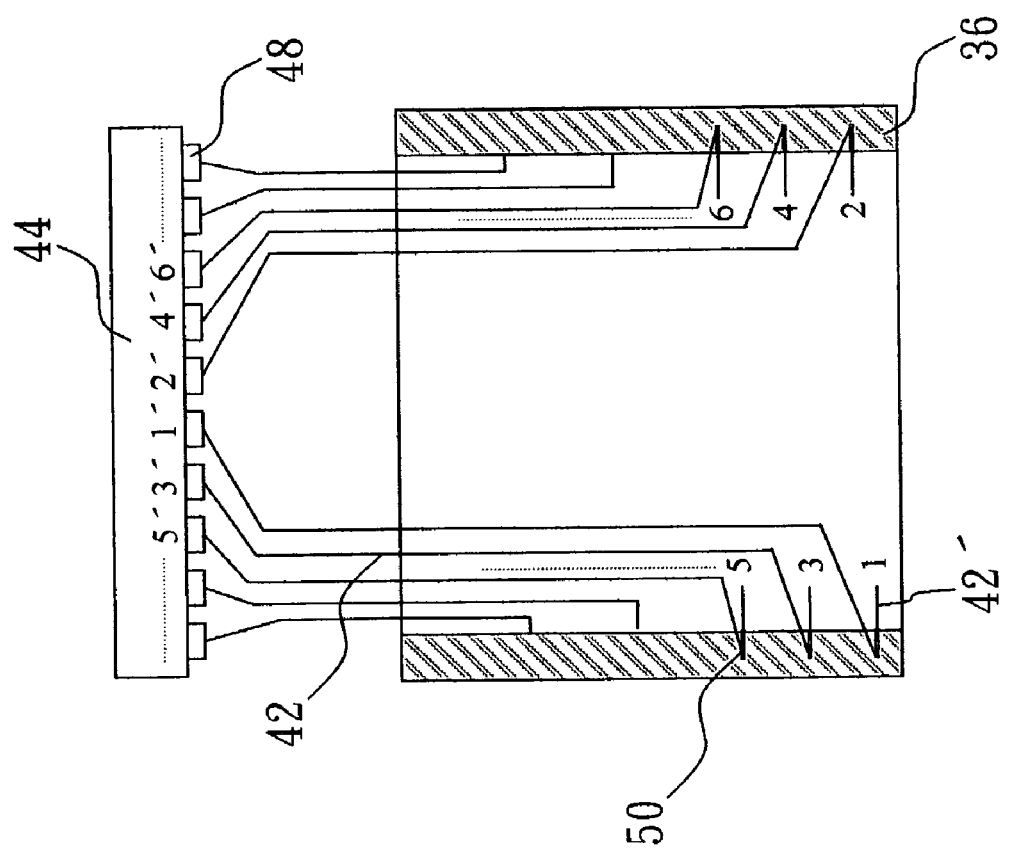
FIG. 6 is a diagram showing the connection of signal scan lines and a signal scan control IC according to another embodiment of the present invention.

In addition to being controlled by adjusting IC design described above, the layout for connection of the signal scan lines 42 and the signal scan control IC 44 can also be accomplished by means of double-layer layout to connect the signal scan lines to the signal scan control IC, as shown in FIG. 6. A plurality of signal scan lines 42 at the lower layer connected to contacts 48 of a signal scan control IC 44 are disposed on the glass substrate 32' at the lower layer of the liquid crystal panel 30. A plurality of signal scan lines 42' at the upper layer are disposed on the glass substrate 32 at the upper layer. A plurality of conducting spacers 50 are disposed from top to bottom on the frame seal 36 at two sides of the liquid crystal panel 30. These conducting spacers 50 are exploited to connect the signal scan lines 42 at the lower layer with the signal scan lines 42' at the upper layer. Stride of the conducting spacers 50 also inverts the scan order. That is, the scan order of the signal scan lines 42 and 42' on the liquid crystal panel 30 are inverted to be from bottom to top so that the labeled numbers of the signal scan lines 42 and 42' increase from bottom to top. Moreover, the signal scan lines 42 and 42' with odd labeled numbers (1, 3, 5, . . . ) and the signal scan lines 42 and 42' with even labeled numbers (2, 4, 6 . . . ) are divided into two parts and are connected to the signal scan control IC 44. The signal scan control IC 44 can adopt a common control IC. As shown in the figure, the signal scan control IC 44 is divided into a left and a right section. The signal scan lines 42 and 42' led out from the same side of the liquid crystal panel 30 are connected from bottom to top to the contacts 48 at the same section of the signal scan control IC 44. The more upper signal scan lines 42 and 42' are connected to the contacts 48 at the more outer side of the signal scan control IC 44. The conducting spacers 50 are Au-spacers. This kind of design of using conducting spacers matched with the double-layer layout does not require special design of the signal scan control IC 44. A common control IC is satisfactory. Besides, the above control IC 44 with adjusted order of the contacts 48 can match the conducting spacers 50 to more facilitate the circuit layout in consideration of the cost.

In the present invention, the control ICs 44 and 46 are disposed at an upper and a lower side of the liquid crystal panel 30 so that the circuit layout will not occupy much space of the left and right side of the liquid crystal panel 30, hence effectively increasing the disposal space of the pixels 39 of the liquid crystal panel 30 and thus increasing the image display area. The design of alternately connecting the adjacent signal scan lines 42 from different ends thereof to the signal scan drive IC 44 located above will reduce the voltage difference between adjacent contacts 48 on the signal scan control IC 44. Moreover, the signal scan control IC 44 is separated from a conventional single chip IC. Therefore, it is only necessary to use a low pressure process for the data transmission control IC 46 integrating the functions of a memory, a controller and driving the data transmission lines without the need of a high pressure process for the signal scan control IC 44, hence lowering the cost. Furthermore, because no external memory and controller are required, the convenience of use of portable products can be greatly enhanced. The design of replacing a conventional expensive single-chip IC with two cheap control ICs also greatly lower the price of portable products to meet the requirement of multiple functions and low price.

On the other hand, the signal scan control IC can also be disposed at the left or right side of the liquid crystal panel so that each signal scan line is directly led out from the one side near the signal scan control IC to the data transmission control IC.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A drive module of a liquid crystal panel used to control the brightness of a plurality of pixels arranged in array on a liquid crystal panel, said drive module comprising a plurality of signal scan lines and a plurality of data transmission lines, each of said signal scan lines being connected to a transversal row of said pixels, each of said data transmission lines being connected to a longitudinal row of said pixels, at least a signal scan control IC and a data transmission control IC being respectively disposed at an upper and a lower side of said liquid crystal panel, each of said data transmission lines being connected to said data transmission control IC with the shortest distance, said signal scan lines being connected to said signal scan control IC from two sides of said liquid crystal panel, a memory component and a panel controller being built in said data transmission IC, wherein said plurality of signal scan lines connected to said signal scan control IC are respectively disposed at an upper and a lower layer of said liquid crystal panel, a frame seal is annularly disposed at a periphery of said liquid crystal panel, a plurality of conducting spacers are disposed on said frame seal, said conducting spacers connect said signal scan lines at the upper layer with said signal scan lines at the lower layer to invert the scan order of said signal scan lines, contacts on said signal control IC connected to said signal scan lines are divided into two sections, said signal scan lines led out from the same side of said liquid crystal panel are connected to the same section on said signal scan control IC.

2. The drive module as claimed in claim 1, wherein contacts on said signal control IC connected to said signal scan lines are divided into two sections, said signal scan lines led out from the same side of said liquid crystal panel are connected to the same section on said signal scan control IC, the earlier one of said signal scan lines on said liquid crystal panel is to be scanned, the closer to the inner side it is connected to one of said contacts on said signal scan control IC.

3. A drive module of a liquid crystal panel used to control the brightness of a plurality of pixels arranged in array on a liquid crystal panel, said drive module comprising a plurality of signal scan lines and a plurality of data transmission lines, each of said signal scan lines being connected to a transversal row of said pixels, each of said data transmission lines being connected to a longitudinal row of said pixels, at least a signal scan control IC and a data transmission control IC being respectively disposed at two adjacent sides of said liquid crystal panel, said data transmission lines being connected to said data transmission control IC, said signal scan lines being connected to said signal scan control IC, a memory and a panel controller being built in said data transmission IC, wherein said plurality of signal scan lines connected to said signal scan control IC are respectively disposed at an upper and a lower layer of said liquid crystal panel, a frame seal is annularly disposed at a periphery of said liquid crystal panel, a plurality of conducting spacers are disposed on said frame seal, said conducting spacers connect said signal scan lines at the upper layer with said signal scan lines at the lower layer to invert the scan order of said signal scan lines, contacts on said signal control IC connected to said signal scan lines are divided into two sections, said signal scan lines led out from the same side of said liquid crystal panel are connected to the same section on said signal scan control IC.

* * * * *